United States Patent [19]
Willinger et al.

[11] 3,744,454
[45] July 10, 1973

[54] ROCK AND GRAVEL BED SIMULATION FOR AQUARIUMS

[75] Inventors: Allan H. Willinger, New Rochelle; Albert J. Dinnerstein, Far Rockaway, both of N.Y.

[73] Assignee: Metaframe Corporation, Clifton, N.J.

[22] Filed: June 4, 1971

[21] Appl. No.: 150,061

[52] U.S. Cl............................ 119/5, 161/18, 161/19
[51] Int. Cl. .......................... A01k 64/00, B44f 9/04
[58] Field of Search ...................... 161/18, 19; 119/5

[56] References Cited
UNITED STATES PATENTS

| | | | |
|---|---|---|---|
| 3,097,080 | 7/1963 | Weir | 161/19 |
| 3,322,609 | 5/1967 | Vida | 161/5 |
| 3,327,686 | 6/1967 | Holden | 119/5 |
| 3,563,204 | 2/1971 | Szilagyi | 119/5 |

*Primary Examiner*—J. Steinberg
*Attorney*—Friedman & Goodman

[57] ABSTRACT

An article for simulating a natural appearance of a rock, sand and gravel bed, the article comprising a deformed blank. The blank is generally vacuum-formed and provided with an upper exposed surface having a roughened texture. The roughened texture either alone or in combination with other elements secured thereto acts to simulate aquatic-bed particle matter. The blank furthermore is provided with enlarged recesses for receiving plant replica, rock, sand and gravel to stereoscopically cooperate with the roughened texture of the blank to further enhance simulation of a natural rock, sand and gravel bed.

7 Claims, 5 Drawing Figures

ALLAN H. WILLINGER
ALBERT J. DINNERSTEIN
INVENTORS

BY Friedman and Goodman
ATTORNEYS

ALLAN H. WILLINGER
ALBERT J. DINNERSTEIN
INVENTORS

BY Friedman and Goodman
ATTORNEYS

ROCK AND GRAVEL BED SIMULATION FOR AQUARIUMS

BACKGROUND OF THE INVENTION

The present invention relates generally to aquarium accessories, and more particularly to means for simulating a natural appearance of a rock, sand and gravel bed for disposition into an aquarium as an appropriate replacement for actual rock, sand and gravel that is otherwise usually disposed in an aquarium or the like.

Generally, when the aquarium hobbyist wishes to arrange a fish tank aquarium he generally deposits rock, sand and gravel along the base of the aquarium and thereafter disposes a plurality of plants, natural or artificial, along the already disposed rock, sand and gravel to thereby provide an aquatic-bed background or "seascape" for tropical fish which are to be displayed in the aquarium.

This manner of conventionally arranging a fish tank aquarium has a number of serious disadvantages associated with it and particularly with regard to the utilization of rock, sand and gravel. In this respect, rock, sand and gravel are generally heavy and cumbersome at the outset, for example a ten gallon fish tank aquarium requires approximately ten to fifteen pounds of gravel for disposition along the base thereof, and, therefore, it is clearly inconvenient and troublesome to purchase and carry gravel from the retail store or the like and thereafter deposit the gravel into the aquarium. The gravel is heavy, difficult to manipulate and, therefore, it is possible and often the case that gravel spills from the bag or container therefor while being emptied into the aquarium, an undesirable situation at best.

Another disadvantage associated with this manner of arranging the fish tank aquarium is the fact that because of the great weight of gravel, the overall weight of the aquarium is unduely increased.

Still another disadvantage associated with the conventional manner of arranging a fish tank aquarium is the fact that debris and fish excrement is often embedded between the gravel particles and, therefore, notwithstanding the utilization of a filtration device, the embedded debris is often left remaining in embedded relation with the gravel and thus the gravel after extended periods tends to become unsightly.

There is still another disadvantage associated with the conventional manner of arranging the fish tank aquarium in that the utilization of individual rocks, sand and gravel often leaves the hobbyist who is a so-called "beginner" or "novice" confused as to the most efficient manner for arranging the rock, sand and gravel relative to one another and the manner by which the plants are to be arranged and embedded into the rock, sand and gravel. Obviously, the rocks and plants should be spaced from one another to most appropriately enhance the esthetic nature of the aquatic-bed background, and thus it is very possible for the "novice" to deposit the plants and rocks such that they either overcrowd the aquarium or, alternatively, are sparcely separated ineffectively throughout the aquarium. In either instance, the overall natural and asthetic appearance of the aquarium may be reduced somewhat and unless the "novice" has some means for being instructed as to the proper manner for disposing the rocks and plants relative to one another in the aquarium, the appearance of the fish tank aquarium will be less than most desirable.

Indeed, another disadvantage associated with the conventional manner of arranging the conventional fish tank with rock, sand and gravel is the fact that these particles are often expensive and, therefore, there is the tendency for the hobbyist to provide a quantity of rock, sand and gravel which is less than most effective for properly covering the base of the aquarium. Moreover, it is equally possible that the "novice" may underestimate the quantity of gravel required for filling the base of the aquarium and, therefore, in this manner also, the appearance of the aquarium may be less than most natural.

SUMMARY OF THE INVENTION

Accordingly, it is an object of the present invention to provide an article which simulates a natural appearance of a rock, sand and gravel aquatic-bed.

It is another object of the present invention to provide an article which simulates a natural appearance of a rock, sand and gravel bed and which reduces the necessary quantity of heavy and cumbersome gravel and the like in an aquarium.

It is a further object of the present invention to provide an article which simulates a natural appearance of a rock, sand and gravel bed for disposition into an aquarium so as to reduce the necessity for experimentally determining a natural appearing aquatic-bed background for tropical fish, yet which does permit the aquarium hobbyist to experiment with his imagination as to the selection of various plants that may be operatively associated with the article pursuant to the present invention.

It is another object of the present invention to provide means for stereoscopically combining artificial and natural elements which convey an enhanced natural appearance of a rock, sand and gravel aquatic-bed.

To this end, the present invention relates generally to an article for simulating a natural appearance of a rock, sand and gravel bed, the article comprising a deformed blank. The blank is generally vacuum-formed or the like and provided with an upper exposed surface having a roughened texture. The roughened texture either alone or in combination with other elements secured thereto acts to simulate aquatic-bed particle matter. The blank furthermore is provided with enlarged recesses for receiving plants or plant replica, rock, sand and gravel to stereoscopically cooperate with the roughened texture of the blank to further enhance simulation of a natural rock, sand and gravel bed.

BRIEF DESCRIPTION OF THE DRAWINGS

With the above and additional objects and advantages in view as will hereinafter appear, this invention comprises the devices, combinations, and arrangements of parts hereinafter described and illustrated in the accompanying drawings of a preferred embodiment in which.

DETAILED DESCRIPTION OF THE INVENTION

Figure 1:
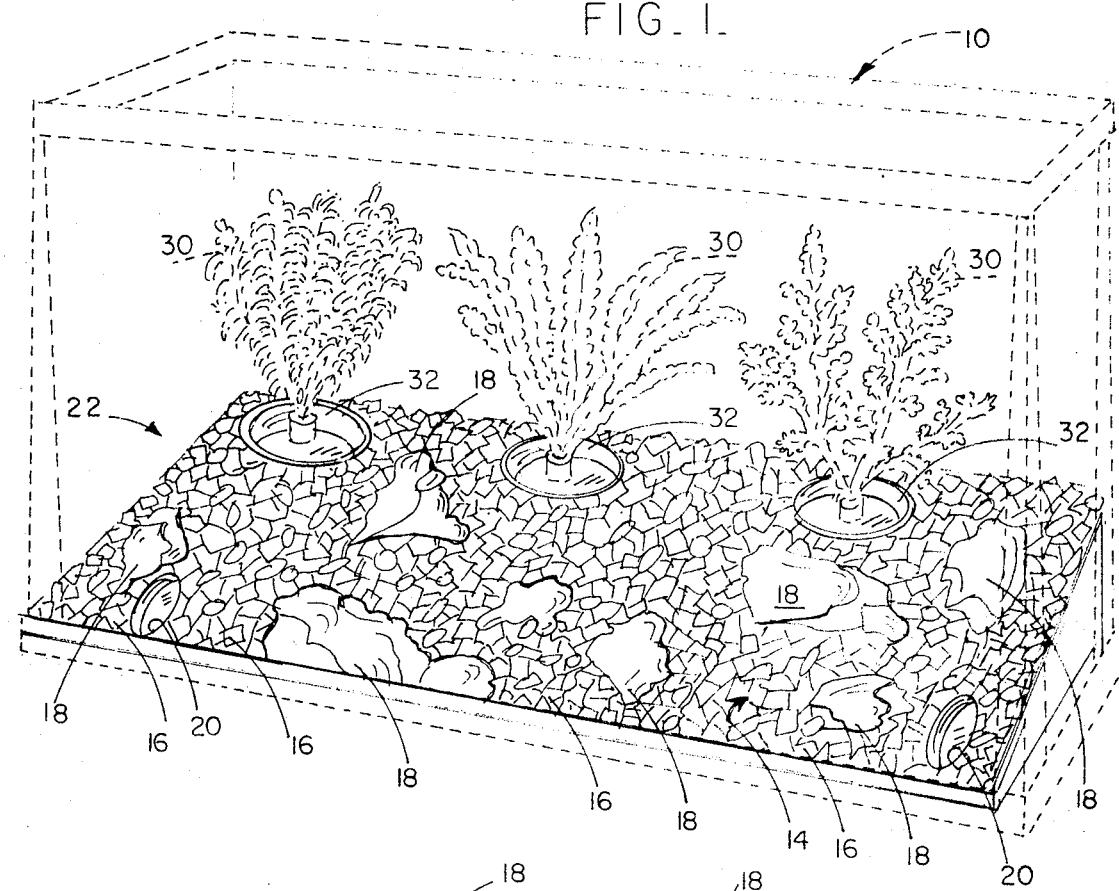
FIG. 1 illustrates the article pursuant to the present invention as arranged in a conventional fish tank aquarium, the latter being illustrated in phantom, the article supporting replica of plant life, the plant life being illustrated in phantom.

Referring now to the drawings and more particularly to FIG. 1, there is illustrated, in phantom, a conventional fish tank aquarium generally denoted by the reference character 10. Arranged internally of the aquarium 10 at the lower portion or base thereof is an article 12 generally vacuum-formed and constituted of thermoplastic or the like. Article 12 includes an upper exposed surface 14 having a generally roughened texture which simulates intermingled sand and gravel 16 and enlarged rocks 18 dispersed generally in the sand and gravel 16.

Figure 4:
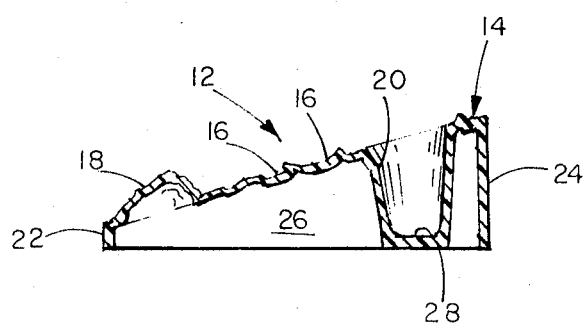
FIG. 4 illustrates a cross-sectional view taken along the line 4—4 in FIG. 3.

It should be clear that the roughened texture which simulates the sand, gravel and rocks in effect is simply a plurality of elevated portions and a plurality of depressed portions extending adjacent one another in random array such as most clearly illustrated in FIG. 4.

Figure 2:
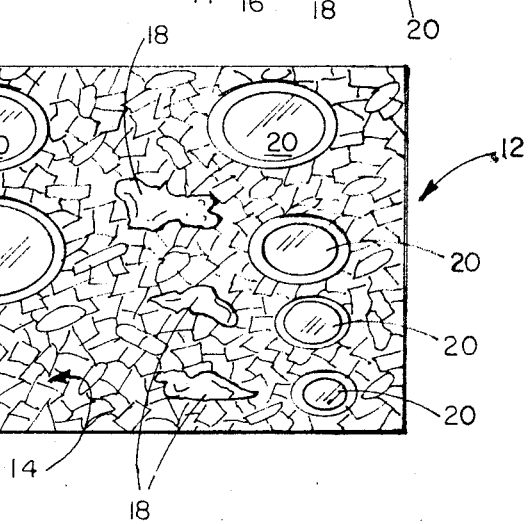
FIG. 2 illustrates a plan view of the upper surface of the article pursuant to the prevent invention.
Figure 3:
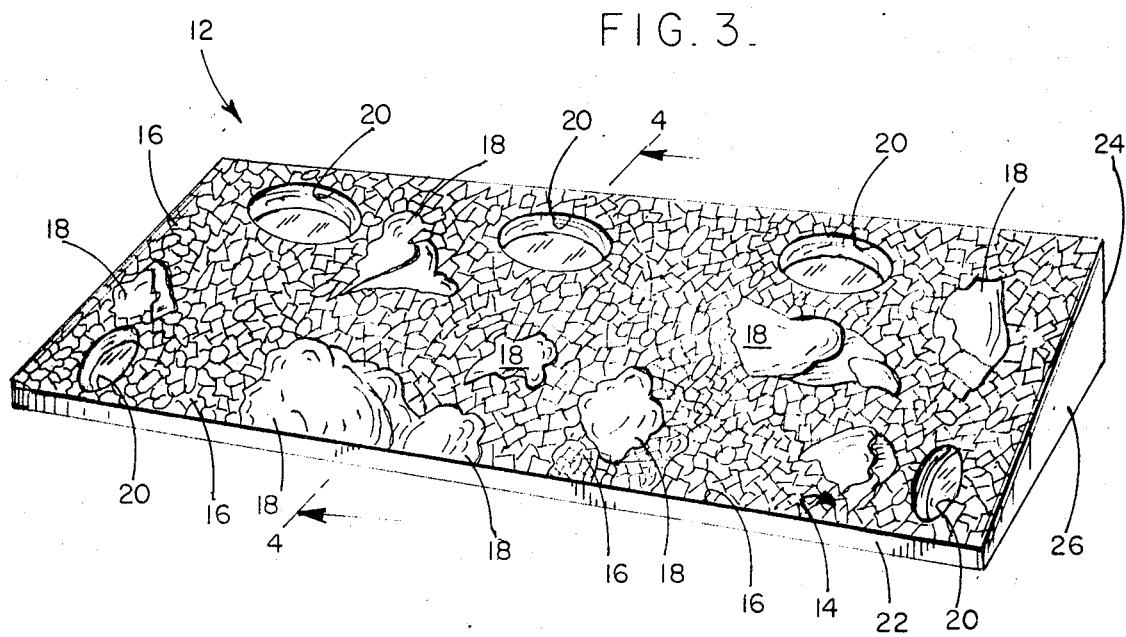
FIG. 3 illustrates a generally perspective view of the article pursuant to the present invention.

Referring now to FIGS. 2-4, the article 12 pursuant to the present invention includes a front wall 22, a rear wall 24 opposite the front wall 22, and two opposing side walls 26. As most clearly illustrated in FIG. 4, the front wall 22 has an elevated extent which is substantially less than the elevated extent of the rear wall 24. Thus, the upper exposed surface 14 of the article 12 is generally inclined upwardly from the front wall 22 toward the rear wall 24, the purpose of which is to enhance the rearward depth appearance of an aquarium wherein it is disposed.

Figure 5:
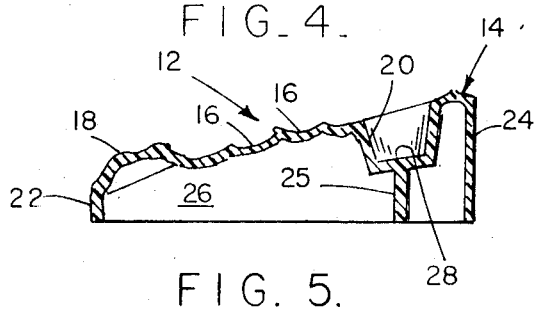
FIG. 5 is a view of an alternate embodiment similar to FIG. 4.

Each of the enlarged recesses 20 is open adjacent the upper exposed surface 14 and includes a bottom portion 28 which is closed and extends substantially at the lower confines of the front and rear walls, 22 and 24 respectively. The purpose of providing the enlarged recesses 20 each with a bottom portion which is closed and which extends adjacent the lower confines of the front wall 22 and rear wall 24 is to permit the latter recesses 20 to be filled with sand and gravel and support the latter without the surface 14 from undergoing distortion or deforming under the relatively substantial weight of the sand and gravel. Obviously, as illustrated in FIG. 5, projections 25 or the like extending transversely of the bottom portion 28 may be utilized to obviate the necessity for providing the recesses 20 with the extended depth illustrated in FIG. 4. This, too, prevents excessive distortion of the surface 14.

In this respect, the enlarged recesses 20 readily accommodate natural or artificial plants 30 or the like, the latter each having a base portion 32 which is generally cup-shaped as most clearly illustrated in FIG. 1. Thus, the cup-shaped base 32 of each of the plants 30 may be readily inserted into the enlarged recesses 20 respectively and thereafter receive sand and gravel, the latter which acts to conceal and generally cover the base portin 32 of each of the artificial plants 30. As those skilled in the art readily appreciate, after the sand and gravel has been deposited into each of the cup-shaped bases 32 of the artificial plants 30 respectively, the sand and gravel not only acts to conceal these base portions 32, but also cooperatively imparts stereoscopically together with the artificial sand and gravel 16 and rocks 18, disposed on or formed as part of the article 12, a natural aquatic-bed background of rock, sand and gravel.

The stereoscopic effect achieved by the cooperation of both the artificial rock, sand and gravel, 18 and 16 respectively, is an extremely important feature of the present invention. In this respect, by utilizing a minimum quantity of rock, sand and gravel, the latter which is actually deposited into the cup-shaped bases 32 of the artificial plants 30 respectively, in combination with the illustrative appearance of the upper exposed surface 14 of the article 12, which illustrative appearance is defined by the roughened texture of intermingled sand and gravel 16 and rocks 18, there is achieved an overall stereoscopic appearance of natural and artificial elements which fully imparts an overall natural appearance of an aquatic-bed or "seascape."

As discussed above, the enlarged recesses 20 have a depth such that the closed bottom portion 28 thereof respectively is substantially at the lower confines of the front and rear walls 22 and 24 respectively. Thus, whenever actual rock, sand and gravel is deposited into the cup-shaped base 32 of each of the artificial plants 30, the article 12 will not deform under the weight or load of the rock, sand and gravel.

Furthermore, because of the bouyant tendency, due to air entrappment or the like, for the article 12 which is constituted generally of light-weight thermoplastic or the like and possibly has a specific gravity less than that of water, to at least partially float in water, the partial utilization of actual rocks, sand and gravel acts to maintain the article 12 along the base of the aquarium 10 and prevent the latter from rising thereby resisting its bouyant tendency. Thus, the article 12 under the load of the minimal amount of rock, sand and gravel, will remain in a fixed position along the base of the aquarium.

It is significant to note, that because of the generally impervious nature of the upper exposed surface 14 of the article 12, there is prevented substantial collection of debris which otherwise tends to embed itself or settle into actual rock, sand and gravel which is usually disposed internally of the aquarium in the absence of the present invention. Thus, filtration devices or the like may readily and effectively cleanse the aquarium and remove debris that is thus prevented from embedding itself into the article 12. The entire arrangement of the tank or aquarium, thus, remains in a clean and esthetically pleasing condition.

It is also significant that the roughened texture of the upper exposed surface 14 may be provided with a very thin contiguous layer of particles such as natural or artificial sand and gravel or the like which is secured thereto such as by means of an adhesive or the like. Furthermore, alternatively, the roughened texture of the upper exposed surface 14 may be colored such as by spraying or the like with a plurality of different colors which act to simulate, colorwise, the rock, sand and gravel.

Thus, the present invention affords means for obviating the necessity for providing a great quantity of rock, sand and gravel which is otherwise heavy and cumbersome and, moreover, inconvenient and troublesome to arrange in an aquarium. It is significant to note that the enlarged recesses 20 are spaced from one another in a preferred orientation and are of varying sizes for accommodating different sized plants or artificial replica of the latter. Thus, an aquarium hobbyist is permitted to at least partially experiment with the esthetic nature of the aquatic-bed in that different types of plants and different sizes of plants may be disposed in the enlarged recesses 20 in a manner as the size of these enlarged recesses 20 tends to dictate. Moreover, the overall appearance of the aquatic-bed background remains esthetically pleasing in that debris and the like cannot embed itself into the article 12 pursuant to the present invention and, therefore, filtration devices may effectively operate to remove all debris.

The finished article pursuant to the present invention is, as is well understood, a three-diminsional element of irregular extent and constituted generally of plastic or the like. Obviously, as those skilled in the art readily appreciate, the article pursuant to the present invention may be mass-produced or manufactured such as by injection-molding, stamping, casting and a myriad of other feasible procedures, all of which are intended to be within the scope of the present invention.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention.

What is claimed is:

1. An article for simulating a natural appearance of a rock, sand and gravel bed in an aquarium, said article comprising a unitary relatively thin walled member including an upper exposed surface with spaced front and rear walls extending downwardly from said upper surface, said upper surface being disposed in the aquarium above a bottom portion of the aquarium with said front and rear walls resting on the aquarium bottom portion to support and space said upper surface above the aquarium bottom portion, said rear wall being provided with a greater vertically elevated extent than said front wall to incline said upper surface upwardly from said front wall toward said rear wall to enhance the rearward depth appearance of said article within the aquarium, said upper surface being provided with a roughened texture, said roughened texture including means for simulating aquatic-bed particle matter, said upper surface including a plurality of elevated portions and a plurality of depressed portions, said elevated and depressed portions including means for simulating rock, sand and gravel, recess means provided in said upper surface for receiving rock, sand and gravel to maintain said article in position resting on the aquarium bottom portion thereby resisting buoyant tendency of said article and to stereoscopically cooperate with said means which simulates rock, sand and gravel, said recess means including lower portions corresponding in depth to lowermost portions of said front and rear portions for resting on the aquarium bottom portion to permit said recess means to hold the rock, sand and gravel without said upper surface deforming under weight of the rock, sand and gravel, said recess means including a plurality of enlarged recesses, said recesses being open at said upper surface and closed at opposite end portions disposed below said upper surface to define open receptacles, said recesses being sufficiently large for accommodating plant life representation which extend above said upper surface.

2. An article as claimed in claim 1 wherein said recess means lower portions are bottom surfaces of said opposite end portions of said recesses.

3. An article as claimed in claim 1 wherein said recess means lower portions are projections extending downwardly from said opposite end portions of said recesses.

4. An article as claimed in claim 1 wherein said article is constituted generally of thermoplastic material.

5. An article as claimed in claim 1 wherein said means which simulates aquatic-bed particle matter includes a thin layer of particles and adhesive means for retaining said particles on said surface.

6. An article as claimed in claim 1 wherein said means which simulates aquatic-bed particle matter includes a pictorial illustration of rock, sand and gravel.

7. An article as claimed in claim 1 wherein said means which simulates aquatic-bed particle matter is defined by the roughened texture of said surface and includes an array of different colors dispersibly intermingled and representative of rock, sand and gravel.

* * * * *